United States Patent
Iwasa et al.

(10) Patent No.: US 9,644,409 B2
(45) Date of Patent: May 9, 2017

(54) UNLOCKING LEVER DEVICE

(71) Applicant: AISIN SEIKI KABUSHIKI KAISHA, Kariya-shi (JP)

(72) Inventors: Kazuya Iwasa, Obu (JP); Yasuhiro Yamakawa, Nantong (CN)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 187 days.

(21) Appl. No.: 14/689,525

(22) Filed: Apr. 17, 2015

(65) Prior Publication Data

US 2015/0300060 A1   Oct. 22, 2015

(30) Foreign Application Priority Data

Apr. 18, 2014   (JP) .................................. 2014-086856

(51) Int. Cl.
 *E05C 19/14* (2006.01)
 *B60N 2/36* (2006.01)
(52) U.S. Cl.
 CPC .............. *E05C 19/14* (2013.01); *B60N 2/366* (2013.01)
(58) Field of Classification Search
 CPC ......... B60N 2/366; E05B 85/26; E05C 19/12; E05C 19/14; Y10T 403/59; Y10T 403/591; Y10T 403/595; Y10T 403/599; Y10T 403/60; Y10T 403/602; Y10T 403/608
 See application file for complete search history.

(56) References Cited

U.S. PATENT DOCUMENTS

| | | | |
|---|---|---|---|
| 2012/0227660 A1 | 9/2012 | Windecker et al. | |
| 2015/0336478 A1* | 11/2015 | Mitsuhashi | B60N 2/22 296/65.09 |

FOREIGN PATENT DOCUMENTS

| | | | | |
|---|---|---|---|---|
| CA | 2864454 A1 * | 8/2013 | ............. | E05B 77/38 |
| DE | WO 2008019835 A1 * | 2/2008 | ............. | B60N 2/123 |
| DE | WO 2011063920 A1 * | 6/2011 | ............. | B60N 2/366 |
| DE | 102011011570 B3 * | 8/2012 | ......... | B60N 2/01516 |
| DE | WO 2012014310 A1 * | 10/2012 | ........... | B60N 2/8366 |
| DE | 102011116709 A1 * | 4/2013 | ........... | B60N 2/2245 |
| JP | 2006-248330 | 9/2006 | | |
| JP | WO 2012173084 A1 * | 12/2012 | ........... | B60N 2/2245 |
| JP | 2013-506597 | 2/2013 | | |

* cited by examiner

*Primary Examiner* — Jonathan Masinick
(74) *Attorney, Agent, or Firm* — Oblon, McClelland, Maier & Neustadt, L.L.P.

(57) ABSTRACT

An unlocking lever device includes: a lever member which is operated to rotate to allow a locking mechanism to perform an unlocking operation; a sign member which is stored in a storage recessed portion provided in the lever member; a bias member which biases the sign member in a direction of protrusion from the storage recessed portion; and an inclined surface which regulates the protrusion of the sign member from the storage recessed portion in accordance with a position of rotation of the lever member by being abut against the sign member, and generates a bias force which allows the lever member to rotate.

6 Claims, 10 Drawing Sheets

UNLOCKING LEVER DEVICE

CROSS REFERENCE TO RELATED APPLICATIONS

This application is based on and claims priority under 35 U.S.C. §119 to Japanese Patent Application 2014-086856, filed on Apr. 18, 2014, the entire contents of which are incorporated herein by reference.

TECHNICAL FIELD

This disclosure relates to an unlocking lever device.

BACKGROUND DISCUSSION

In the related art, in an unlocking lever device which is operated to allow a locking mechanism provided in a vehicle seat or the like to perform an unlocking operation, a sign member which can distinguish whether or not a lever member is in a state of being unlocked is generally provided. For example, in an unlocking lever device disclosed in JP2013-506597T (Reference 1), a sign member which is protruded at a visible position as the lever member is unlocked is provided.

In addition, in the unlocking lever device, in many cases, the lever member is biased in any operating direction by a bias member (spring or the like). Accordingly, it is configured to improve a feeling of handling by suppressing backlash of the lever member.

For example, an unlocking lever device described in JP2006-248330A (Reference 2) is provided with a linking member which links a lever member and a locking mechanism to each other. In addition, "looseness" is set in a linking portion with respect to (a lock releasing member of) the locking mechanism. In the unlocking lever device, by pulling the linking member to the locking mechanism side using the looseness, backlash of the lever member which is linked to the other end side of the linking member is suppressed.

However, even in the unlocking lever device, simplifying the configuration is an important task. Regarding this task, there is a possibility of further improvement by describing that the technology in above-described related art does not necessarily sufficiently satisfy the demand.

SUMMARY

Thus, a need exists for an unlocking lever device which is not suspectable to the drawback mentioned above.

An aspect of this disclosure is directed to an unlocking lever device, preferably including: a lever member which is operated to rotate to allow a locking mechanism to perform an unlocking operation; a sign member which is stored in a storage recessed portion provided in the lever member; a bias member which biases the sign member in a direction of protrusion from the storage recessed portion; and an inclined surface which regulates the protrusion of the sign member from the storage recessed portion in accordance with a position of rotation of the lever member by being abut against the sign member, and generates a bias force which allows the lever member to rotate.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment related to an unlocking lever device which constitutes a vehicular seat locking device will be described with reference to the drawings.

Figure 1:
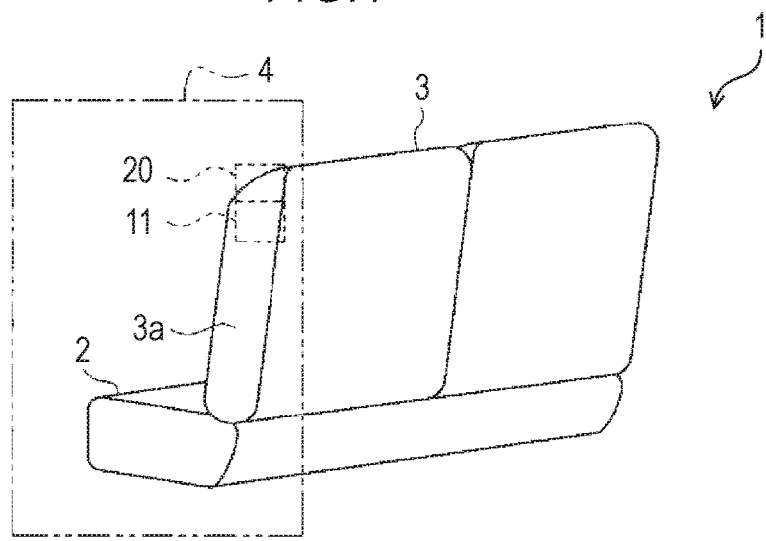
FIG. 1 is a view illustrating a seat locking device which is provided in a vehicular seat.
Figure 2:
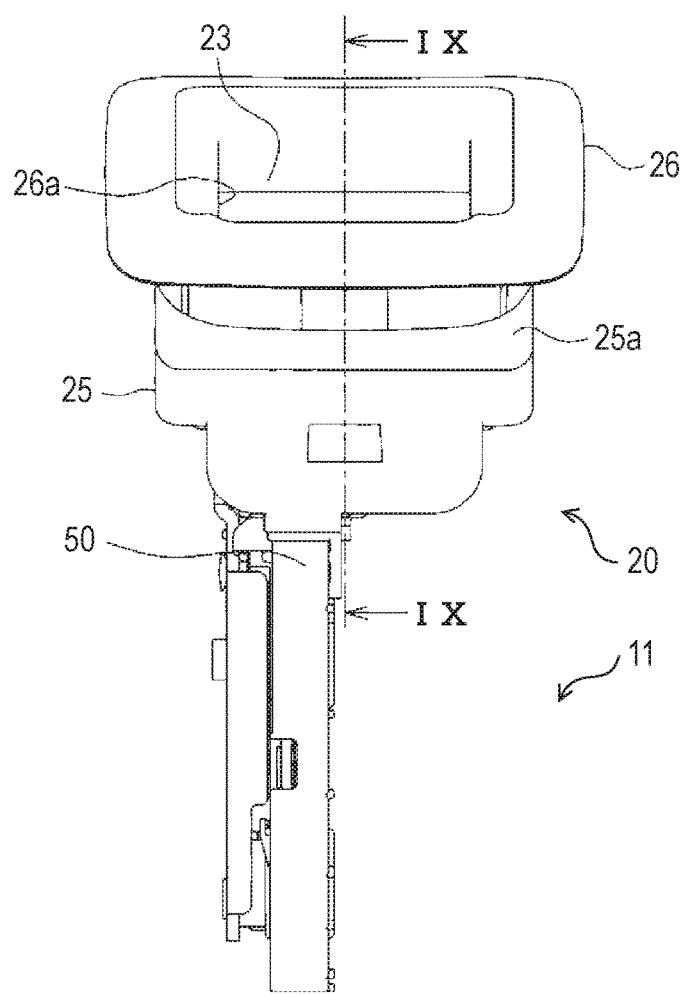
FIG. 2 is a front view of the seat locking device.

As illustrated in FIG. 1, a vehicular seat 1 is provided with a seat cushion 2, and a seatback 3 which is provided to freely incline with respect to a rear end portion of the seat cushion 2. In addition, in the embodiment, the seat 1 is used as a rear seat of a vehicle. Furthermore, in the seat 1, a seat locking device 10 which can restrict the seatback 3 with respect to a vehicle body 4 which is positioned on a side is provided. Specifically, the seat locking device 10 is provided in (the vicinity of an upper end portion in) a side end portion 3a of the seatback 3. In addition, based on a function of the seat locking device 10, the seat 1 of the embodiment can hold the seatback 3 in an upright state (locked state), or can hold the seatback 3 in an inclinable state (unlocked state) by releasing restriction with respect to the vehicle body 4.

As illustrated in FIGS. 2 to 8, the seat locking device 10 of the embodiment includes a locking mechanism 11 which restricts the seatback 3 with respect to the vehicle body 4, and an unlocking lever device 20 for allowing the locking mechanism 11 to perform an unlocking operation, to be integrated with each other.

Specifically, as illustrated in FIGS. 2, and 8 to 12, the unlocking lever device 20 of the embodiment is provided with a lever member (operating lever) 23 which is operated to allow the locking mechanism 11 to perform the unlocking operation, and a housing 24 as a supporting member that supports the lever member 23 to be rotatable.

The housing 24 of the embodiment is provided with a lever storage portion 25 which has an opening portion 25a at one end. In addition, a bezel (cover member) 26 which includes a hole portion 26a that becomes an access window 21 is attached to the opening portion 25a. In addition, the lever member 23 of the embodiment includes an operation surface S1 which faces the access window 21.

Figure 3:
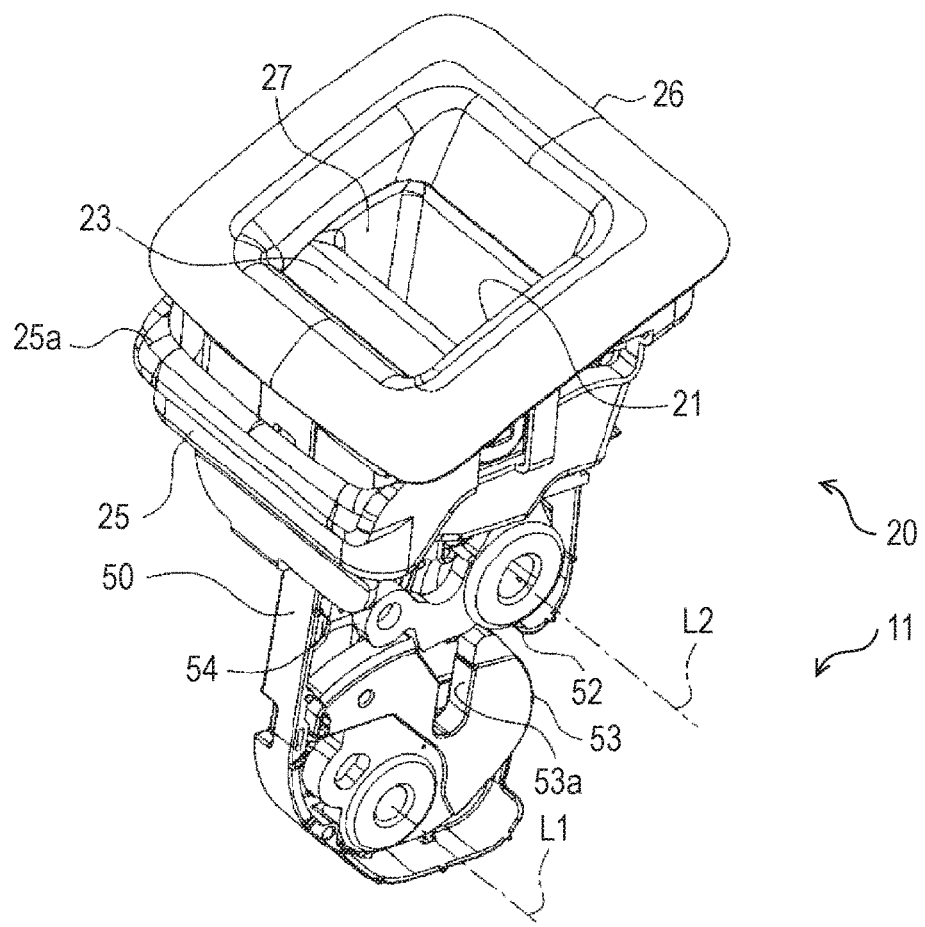
FIG. 3 is a perspective view (locked state) of the seat locking device.
Figure 4:
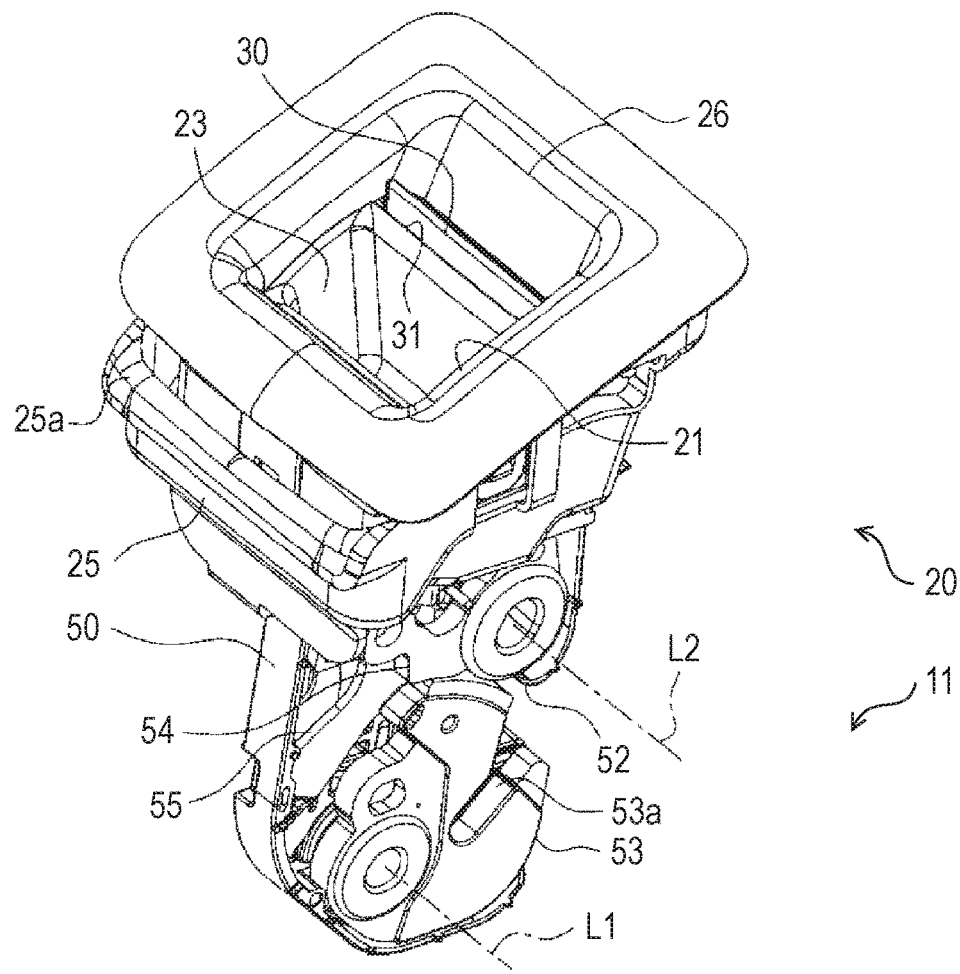
FIG. 4 is a perspective view (unlocked state) of the seat locking device.
Figure 9:
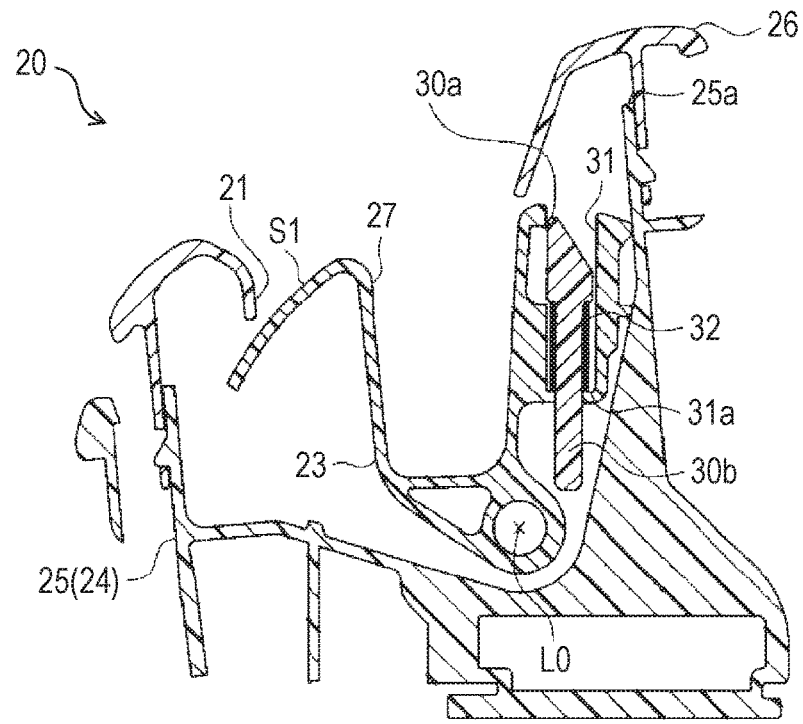
FIG. 9 is a cross-sectional view (cross section along IX-IX in FIG. 2, locked state) of the unlocking lever device.
Figure 10:
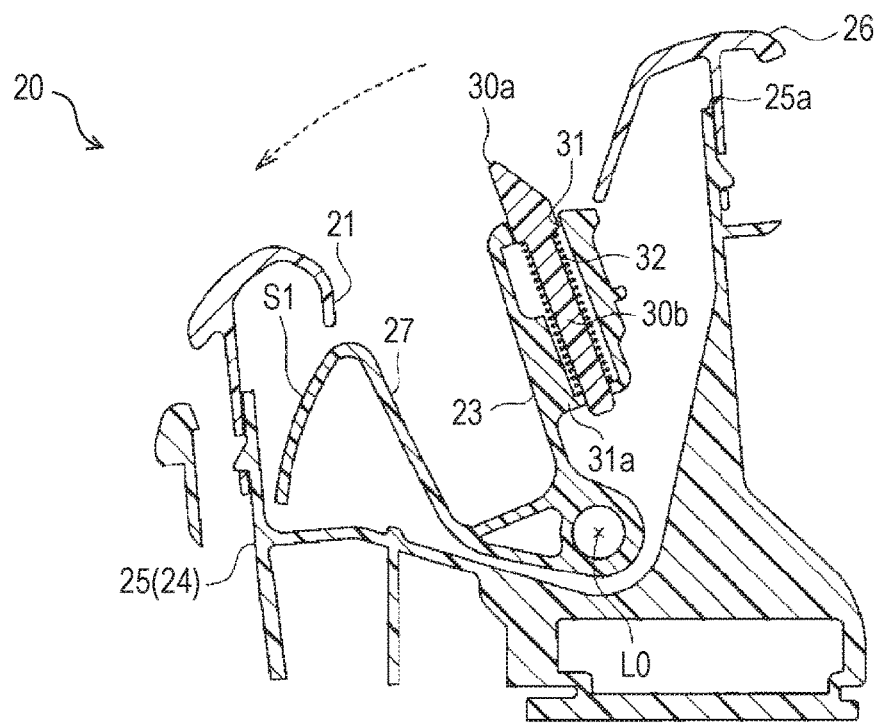
FIG. 10 is a cross-sectional view (cross section along X-X in FIG. 2, unlocked state: full stroke) of the unlocking lever device.
Figure 11:
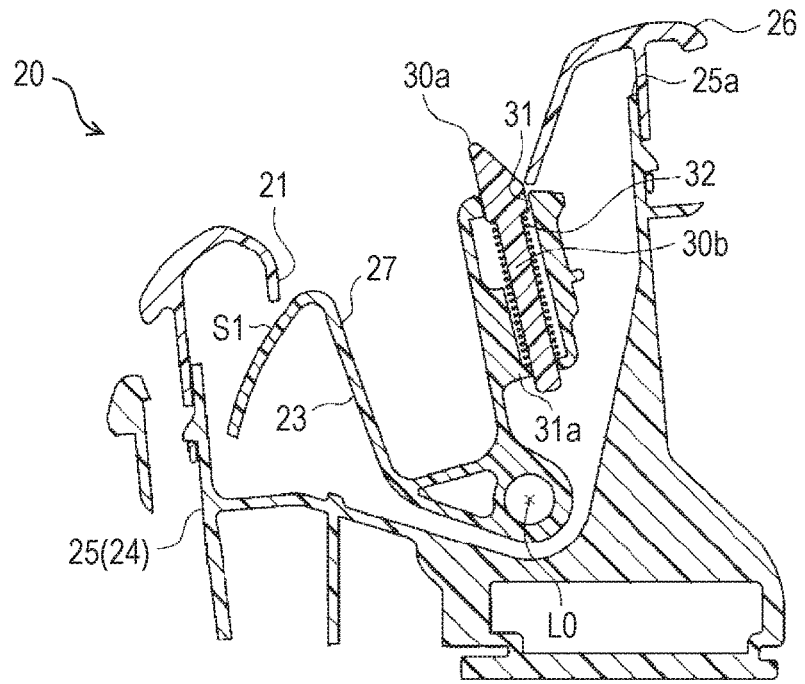
FIG. 11 is a cross-sectional view (cross section along XI-XI in FIG. 2, unlocked state) of the unlocking lever device.

In other words, as illustrated in FIGS. 3 and 4, the unlocking lever device 20 of the embodiment is configured to perform the unlocking operation by rotating the lever member 23 which is stored in the lever storage portion 25 via the access window 21. Specifically, as illustrated in FIGS. 9 to 11, the unlocking operation is performed by rotating the lever member 23 in a counterclockwise direction in each drawing. In addition, in the unlocking lever device 20 of the embodiment, the operation surface S1 of the lever member 23 is a substantially arc-shaped curved surface along a rotating trajectory of the lever member 23. In addition, on the operation surface S1, an operation recessed portion 27 which becomes a gripping portion when the lever member 23 is operated is provided.

In addition, as illustrated in FIGS. 4, and 8 to 12, in the lever member 23 of the embodiment, a sign member (warning element) 30 which rotates integrally with the lever member 23 is provided.

Specifically, as illustrated in FIGS. 9 to 11, in the embodiment, in a case where a direction (the counterclockwise direction in each drawing) in which the lever member 23 is operated to rotate when the unlocking operation is performed is set to be a "near front side (a paper surface near front side with reference to FIG. 2)", a storage recessed portion 31 is formed at a position which is a "far side (paper surface far side with reference to FIG. 2)" which is further than the operation recessed portion 27, on the operation surface S1. Specifically, as illustrated in FIGS. 4, and 8 to 12, the storage recessed portion 31 has a shape of a slit-shaped hole which extends in a width direction (a right-and-left direction in FIG. 12, and a direction which is orthogonal to a paper surface in FIGS. 9 to 11) of the lever member 23. In addition, the sign member 30 of the embodiment is configured to rotate integrally with the lever member 23 by being stored in the storage recessed portion 31.

As illustrated in FIGS. 3 and 9, in the unlocking lever device 20 of the embodiment, when the lever member 23 is not unlocked, that is, when the locking mechanism 11 is in a locked state, the sign member 30 which is stored in the storage recessed portion 31 is disposed outside the access window 21. In addition, as illustrated in FIGS. 4, 10, and 11, when the lever member 23 is unlocked, the sign member 30 moves to a position which faces the access window 21, that is, a position in the access window 21 as the sign member 30 rotates integrally with the lever member 23.

In addition, as illustrated in FIGS. 8 to 12, the unlocking lever device 20 of the embodiment is provided with a compression coil spring 32 as a bias member which biases the sign member 30 in a direction of protrusion from the storage recessed portion 31. In addition, when the lever member 23 is unlocked, based on a bias force of the compression coil spring 32, the sign member 30 which is stored in the storage recessed portion 31 is configured to be protruded from the operation surface S1 (refer to FIG. 4).

Specifically, the sign member 30 of the embodiment is provided with a main body portion 30a which is formed in a rectangular substantially-flat-board shape which extends in the width direction of the lever member 23 corresponding to the shape of a slit of the storage recessed portion 31, and a shaft-shaped portion 30b which extends in a direction (lower sides in FIGS. 9 to 12) which is substantially orthogonal to the main body portion 30a. In addition, the compression coil spring 32 is stored in the storage recessed portion 31 together with the sign member 30 in a state of being fitted and inserted into the shaft-shaped portion 30b.

Furthermore, in the sign member 30 of the embodiment, the shaft-shaped portion 30b is formed at a substantially center part in a longitudinal direction of the main body portion 30a. In addition, on both sides of the shaft-shaped portion 30b, guide portions 30c which guide the operation in a direction in which the sign member 30 is protruded from the storage recessed portion 31 and in a direction in which the sign member 30 is input into the storage recessed portion 31 are respectively provided.

Furthermore, specifically, as illustrated in FIGS. 9 to 11, in the unlocking lever device 20 of the embodiment, the sign member 30 is disposed in the storage recessed portion 31 in a state where the shaft-shaped portion 30b passes through a bottom wall portion 31a of the storage recessed portion 31. Accordingly, in the embodiment, one end side of the compression coil spring 32 is configured to abut against the main body portion 30a of the sign member 30, and the other end side is configured to abut against the bottom wall portion 31a of the storage recessed portion 31. In addition, the unlocking lever device 20 of the embodiment is biased in a protruding direction of the sign member 30 stored in the storage recessed portion 31, based on a spring force (elastic restoring force) of the compression coil spring 32.

Figure 8:
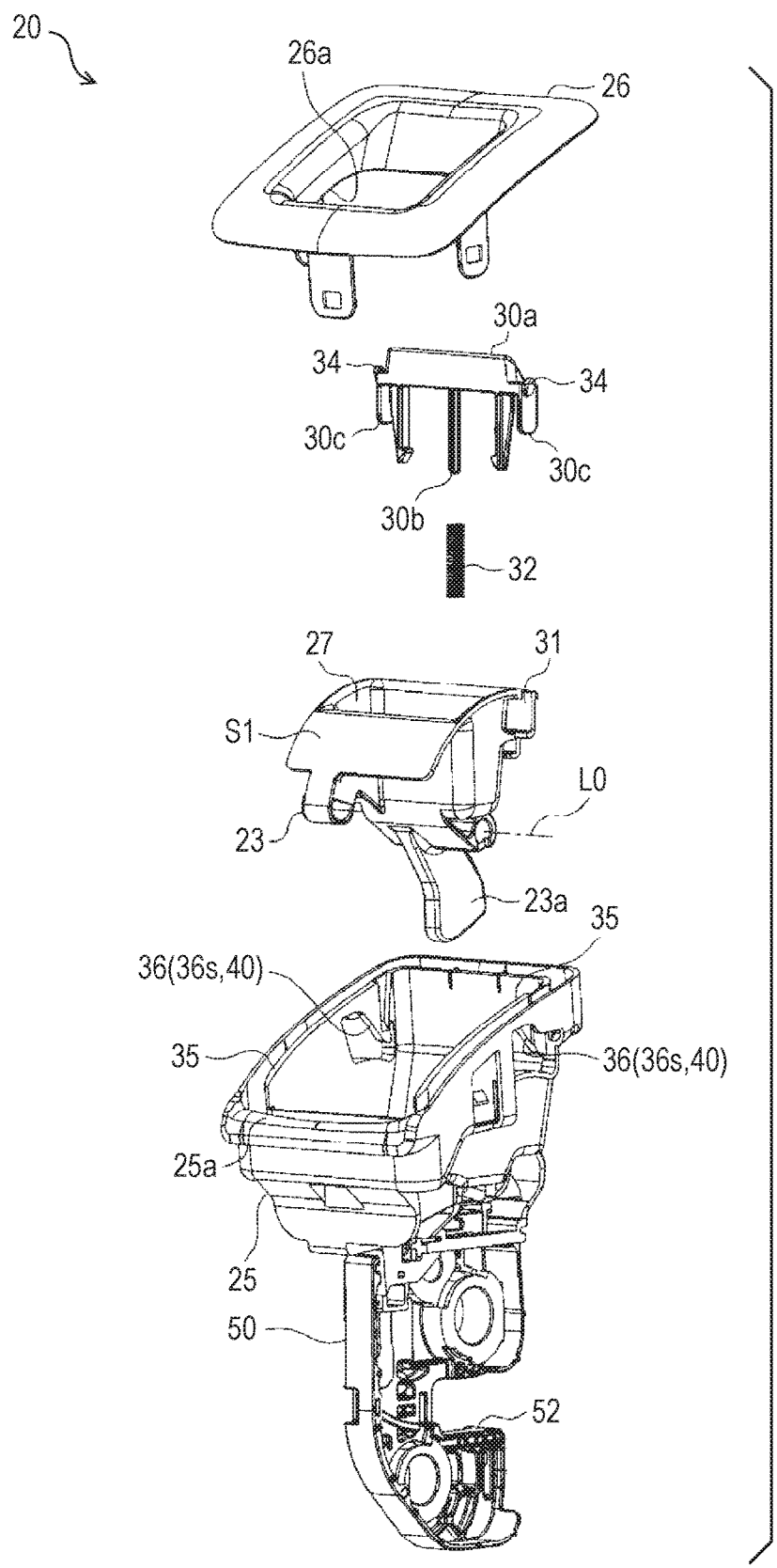
FIG. 8 is an exploded perspective view of an unlocking lever device.
Figure 12:
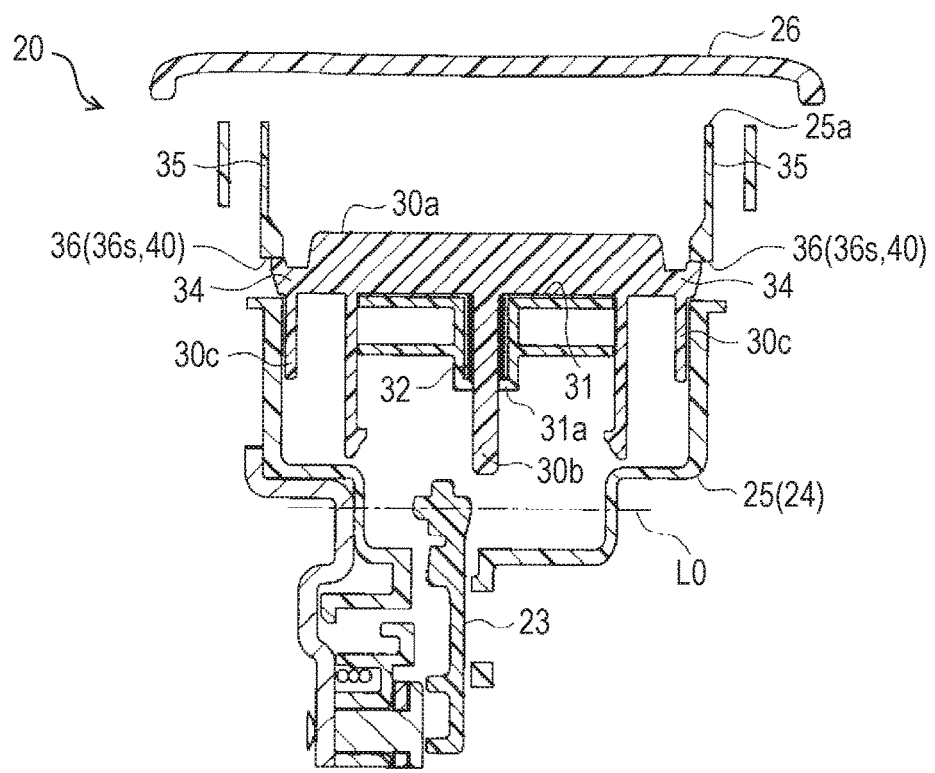
FIG. 12 is a cross-sectional view (cross section along XII-XII in FIG. 5) of the unlocking lever device.
Figure 13:
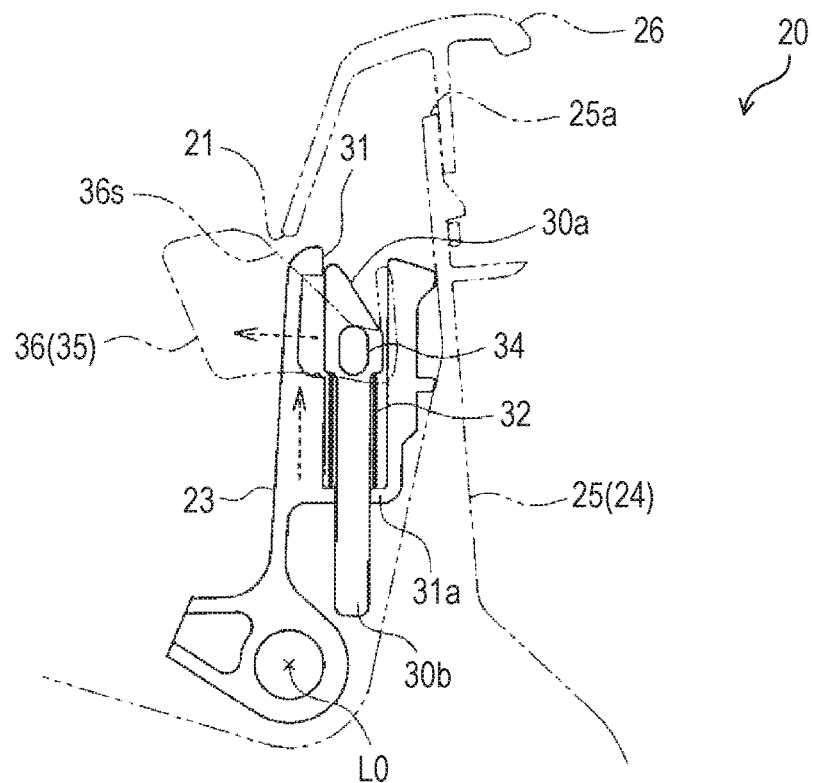
FIG. 13 is a view illustrating an operation of the unlocking lever device.

In addition, as illustrated in FIGS. 8, 12, and 13, the sign member 30 of the embodiment has an engaging protrusion portion 34 on both ends in the width direction. Furthermore, in the housing 24 of the embodiment, in both side wall portions 35 of the lever storage portion 25 which is orthogonal to a rotation shaft L0 of the lever member 23, engaging recessed portions 36 into which each engaging protrusion portion 34 is inserted are respectively formed. In addition, in the embodiment, as each engaging protrusion portion 34 abuts against inner circumferential surfaces 36s of each engaging recessed portion 36, movement of the sign member 30 in the protruding direction is regulated.

Specifically, as illustrated in FIG. 13, on the inner circumferential surfaces 36s of each engaging recessed portion 36, at a position (upper sides in each drawing) against which each engaging protrusion portion 34 of the sign member 30 protruded from the storage recessed portion 31 abuts, an inclined surface 40 is formed so that protrusion of much larger sign member 30 is allowed as the lever member 23 greatly rotates to the "near front side", that is, in a direction of the unlocking operation. Accordingly, in the embodiment, when the storage recessed portion 31 moves to a position which faces the access window 21, that is, a position in the access window 21, (the main body portion 30a of) the sign member 30 which is stored in the storage recessed portion 31 is configured to be protruded from the operation surface S1 (refer to FIG. 4).

Furthermore, in the unlocking lever device 20 of the embodiment, the lever member 23, the sign member 30, the housing 24, and the bezel 26 are respectively formed by using a resin. In addition, by mixing pigments with the resin which becomes a material of the sign member 30, the sign member 30 is colored with a different color from that of the lever member 23 and the bezel 26 (housing 24). For example, the sign member 30 is colored with a so-called warning color, such as a reddish or yellowish color. Accordingly, in the embodiment, it is possible to easily recognize that the sign member 30 is at a position which faces the access window 21 and that the sign member 30 is in a state of being protruded from the operation surface S1.

Furthermore, in the embodiment, as (the engaging protrusion portion 34 of) the sign member 30 presses the inclined surface 40 based on the spring force of the compression coil spring 32, the bias force which rotates the lever member 23 in the direction of the unlocking operation is applied to the sign member 30. Accordingly, the unlocking lever device 20 of the embodiment can suppress backlash of the lever member 23.

In addition, as illustrated in FIGS. 2 to 7, in the seat locking device 10 of the embodiment, the housing 24 which constitutes the supporting member of the unlocking lever device 20 as described above is provided with a lock holding portion 50 which is adjacent to the lever storage portion 25. In addition, in the embodiment, each constituent element of the locking mechanism 11 is assembled to the lock holding portion 50.

Figure 5:
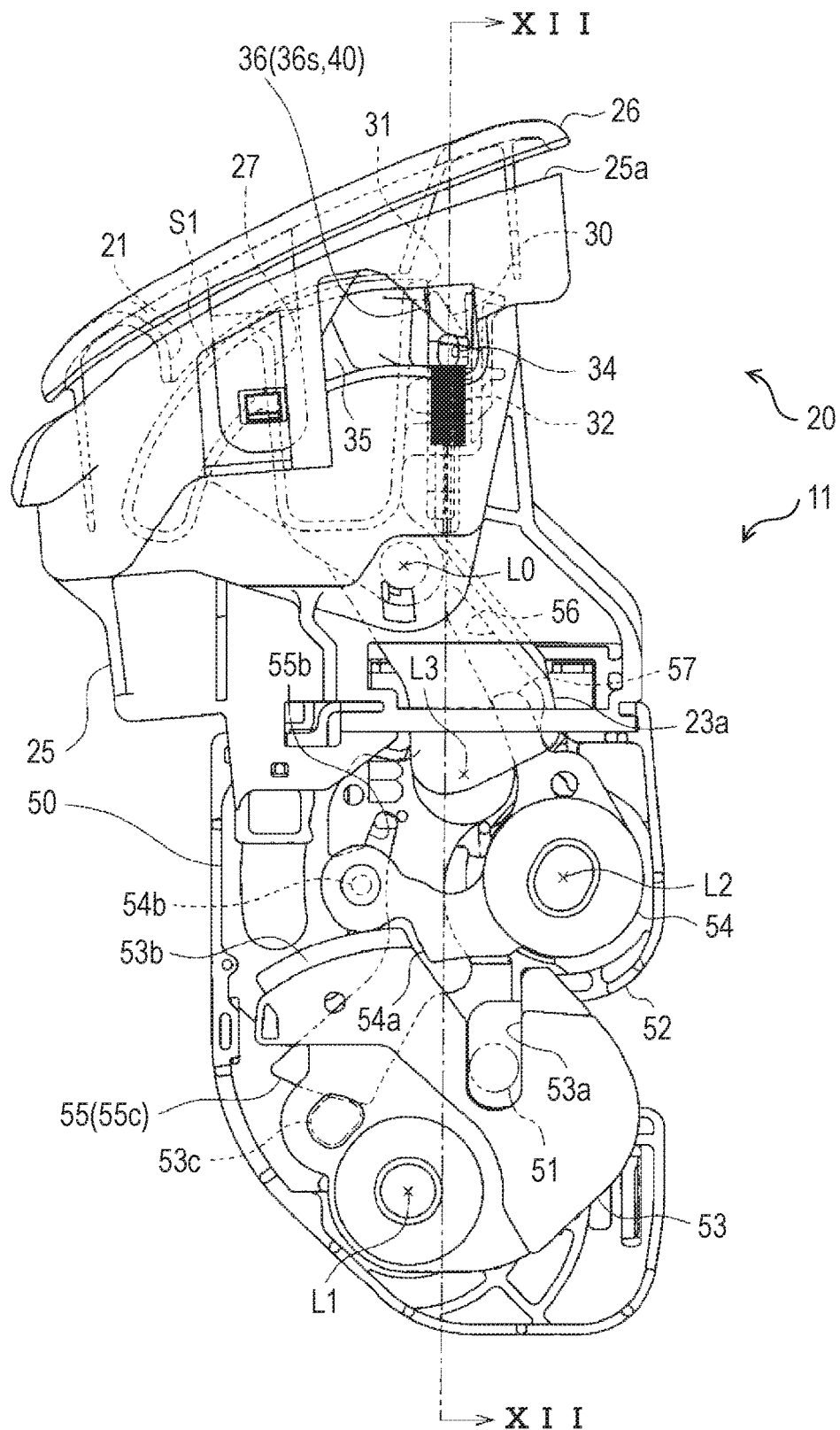
FIG. 5 is a side view (locked state) of the seat locking device.
Figure 6:
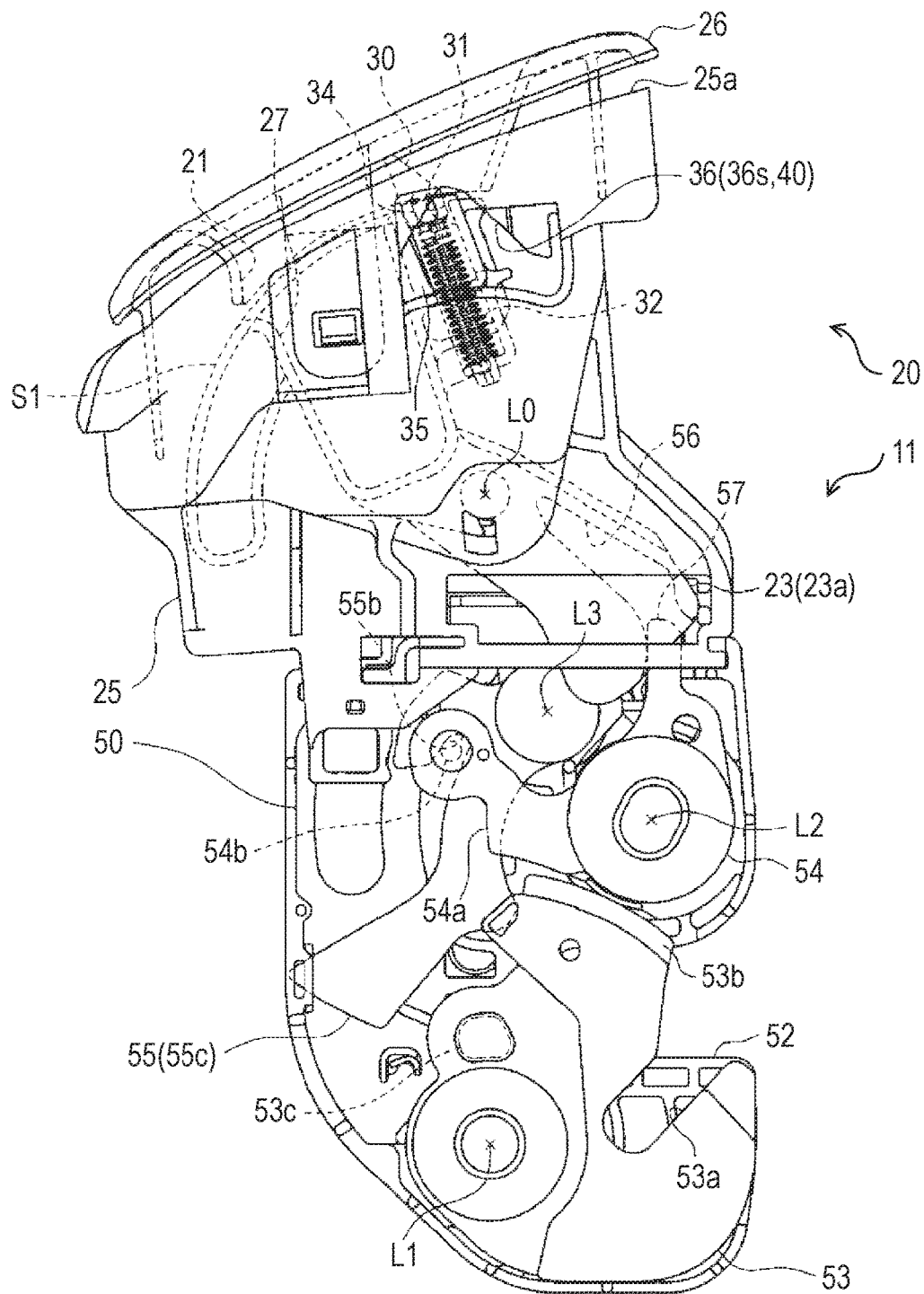
FIG. 6 is a side view (when an unlocking operation is performed: full stroke) of the seat locking device.
Figure 7:
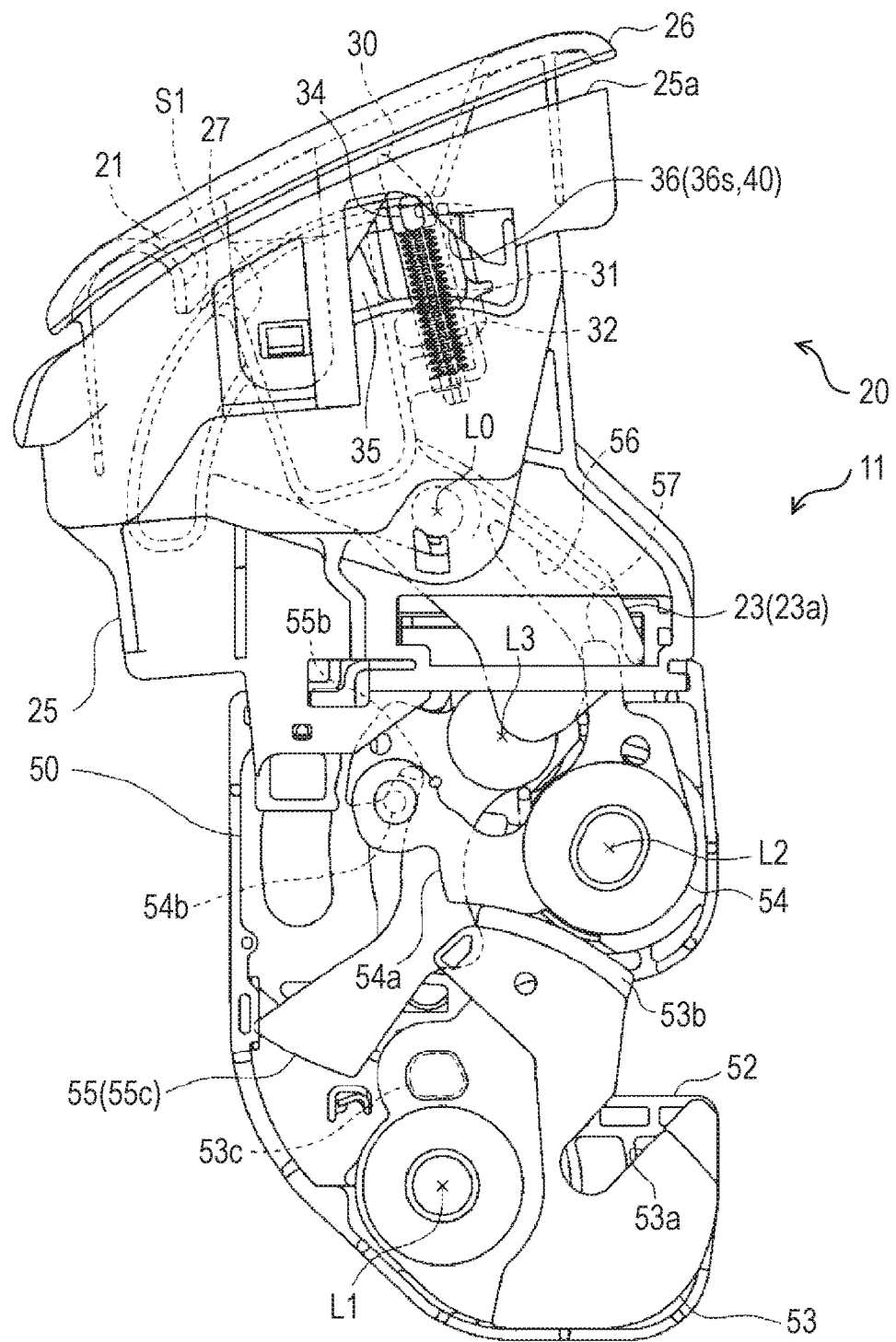
FIG. 7 is a side view (unlocked state) of the seat locking device.

Specifically, as illustrated in FIGS. 5 to 7, in the lock holding portion 50 of the embodiment, a slit portion 52 from which a striker 51 provided on the vehicle body 4 side is input and output is provided. In other words, in the embodiment, based on a pulling-down and pulling-up operation of the seatback 3, the striker 51 is input into and output from the slit portion 52. In addition, the locking mechanism 11 of the embodiment is provided with a latch 53 which includes a striker engaging portion 53a with which the striker 51 is engaged and is supported to be rotatable, and a pole 54 which is engaged with and disengaged from the latch 53.

Specifically, the latch 53 has a rotation shaft L1 which is substantially parallel to the rotation shaft L0 of the lever member 23. In addition, the latch 53 is configured so that the striker engaging portion 53a which functions as a groove portion thereof is opened toward an entering direction (right sides in each drawing) of the striker 51 with respect to slit portion 52 when the latch 53 is in an unlocked state as illustrated in FIG. 7 as the latch 53 is biased to rotate in a clockwise direction in each drawing by a torsion coil spring which is not illustrated. Accordingly, the locking mechanism 11 of the embodiment is configured so that the striker 51 which enters the slit portion 52 is engaged with (the striker engaging portion 53a of) the latch 53.

Furthermore, by pressing the striker 51 which is engaged with the striker engaging portion 53a, the latch 53 is configured to rotate against the bias force of the torsion coil spring (the counterclockwise direction in each drawing). In addition, in the embodiment, as illustrated in FIG. 5, a position to which the striker 51 rotates until an opening direction of the striker engaging portion 53a is in a state of being substantially orthogonal to an extending direction (right-and-left direction in each drawing) of the slit portion 52, becomes a latch position which can restrict so as not to be able to detach the striker 51 which is engaged with the latch 53.

Meanwhile, the pole 54 has a rotation shaft L2 which is substantially parallel to the rotation shaft L1 of the latch 53 at a position where the slit portion 52 is nipped in a groove width direction (up-and-down direction in each drawing). In addition, the pole 54 is configured to be slidably in contact with a circumferential surface of the latch 53 as the pole 54 is biased to rotate in the counterclockwise direction in each drawing by the torsion coil spring which is not illustrated. Furthermore, in the pole 54, as the latch 53 rotates to the latch position as illustrated in FIG. 5, a latch engaging portion 54a which is engaged with a rotation regulating portion 53b is provided. Accordingly, the locking mechanism 11 of the embodiment can restrict so as not to be able to detach the striker 51 which is engaged with the latch 53 as the rotation in a rotation and bias direction of the latch 53 by the torsion coil spring, that is, in a direction in which the striker 51 is retracted from the slit portion 52, is regulated (locked state).

In addition, in the locking mechanism 11 of the embodiment, a rubber member 55 which has a rubber surface 55c with which the rotated latch 53 is engaged by being pressed to the striker 51 as described above is provided. Accordingly, in the embodiment, backlash of the latch 53 in a locked state is suppressed.

Specifically, the rubber member 55 has a rotation shaft L3 which is substantially parallel to the rotation shaft L1 of the latch 53. In addition, the rubber member 55 is biased to rotate in a direction (counterclockwise direction in each drawing) in which the rubber surface 55c approaches the latch 53 by the torsion coil spring which is not illustrated. Furthermore, in the rubber member 55, an engaging groove 55b with respect to an engaging protrusion portion 54b provided in the pole 54 is provided, and the rotation of the rubber member 55 based on the bias force of the torsion coil spring is suppressed by the pole 54 which is engaged with the rubber member 55. Accordingly, the locking mechanism 11 of the embodiment is configured so that the rubber surface 55c of the rubber member 55 is engaged with a rubber engaging portion 53c on the latch 53 side only in a locked state.

Here, the lever member 23 of the unlocking lever device 20 which is supported to be rotatable by the housing 24 as described above is configured so that an end portion 23a on a side opposite to the operation surface S1 is protruded from the lever storage portion 25 and is disposed on the lock holding portion 50 side (lower sides in each drawing). In addition, in the embodiment, a linking portion 56 with respect to the pole 54 is formed in the end portion 23a on the lock holding portion 50 side.

Specifically, in the pole 54 of the embodiment, a fitting protrusion portion 57 which is protruded in a radial direction from a circumferential surface is formed. In addition, the linking portion 56 on the lever member 23 side has a shape of a hole which is fitted to the fitting protrusion portion 57.

In other words, the pole 54 is configured to rotate in a direction (counterclockwise direction in each drawing) in which the pole 54 separates from the circumferential surface of the latch 53 against the bias force of the torsion coil spring as the lever member 23 is unlocked, as illustrated in FIG. 6. Accordingly, in the locking mechanism 11 of the embodiment, as the latch engaging portion 54a on the pole 54 side is separated from the rotation regulating portion 53b on the latch 53 side, the rotation of the latch 53 in a direction in which the striker 51 is retracted from the slit portion 52 is allowed. In other words, the engagement between the latch 53 and the striker 51 is released (unlocked state).

Furthermore, in the unlocking lever device 20 of the embodiment, the linking portion 56 which is formed in the lever member 23 is configured so that the lever member 23 rotates as the linking portion 56 interlocks with the operation of the pole 54. In other words, in the embodiment, by the rotation (counterclockwise direction in each drawing) of the pole 54 in accordance with the engagement of the striker 51 with the latch 53, the lever member 23 which is engaged with the pole 54 rotates in the clockwise direction in each drawing. Accordingly, the unlocking lever device 20 of the embodiment is configured so that the lever member 23 returns to an initial position at which the sign member 30 is disposed outside the access window 21.

Above, according to the embodiment, it is possible to obtain the effects as follows.

(1) The unlocking lever device 20 is provided with the lever member 23 which is operated to rotate to allow the locking mechanism 11 to perform the unlocking operation, and the sign member 30 which is stored in the storage recessed portion 31 provided in the lever member 23. In addition, the unlocking lever device 20 is provided with the compression coil spring 32 as a bias member which biases the sign member 30 in a direction in which the sign member 30 is protruded from the storage recessed portion 31, and the inclined surface 40 which abuts against the sign member 30. The inclined surface 40 is configured to regulate the protrusion of the sign member 30 from the storage recessed portion in accordance with the position of the rotation of the lever member 23, and to generate the bias force which rotates the lever member 23.

According to the above-described configuration, it is possible to allow the sign member 30 to appear from the storage recessed portion 31 in accordance with a situation of the unlocking operation, with a simple configuration. Accordingly, by improving visibility of the sign member 30, it is possible to distinguish whether or not the lever member 23 is easily unlocked.

In addition, as the sign member 30 presses the inclined surface 40 based on the spring force of the compression coil spring 32, the bias force which rotates the lever member 23 is applied to the sign member 30. Accordingly, without providing a dedicated bias member for biasing the lever member 23 to rotate, it is possible to efficiently suppress backlash of the lever member 23 with a simple configuration. In addition, as the sign member 30 is slidably in contact with the inclined surface 40, it is possible to mitigate the operation of the lever member 23, and to suppress generation of collision noise when an unlocked state is switched to a locked state.

(2) The unlocking lever device 20 is provided with the housing 24 which functions as a supporting member which includes the side wall portion 35 which is orthogonal to the rotation shaft L0 and supports the lever member 23 to be rotatable. In addition, in the side wall portion 35, the engaging recessed portion 36 into which the engaging protrusion portion 34 provided in the sign member 30 is inserted is formed. In addition, the inclined surface 40 is formed on the inner circumferential surface 36s of the engaging recessed portion 36.

In other words, the engaging protrusion portion 34 which is inserted into the engaging recessed portion 36 abuts against the inner circumferential surface 36s in the protruding direction. Therefore, according to the above-described configuration, it is possible to stably regulate the protrusion of the sign member 30 in accordance with the position of the rotation of the lever member 23, and to stably bias the lever member 23 to rotate.

(3) The housing 24 supports the lever member 23 at a position which faces the access window 21, and the storage recessed portion 31 is formed at a position at which the sign member 30 moves in the access window 21 as the sign member 30 is disposed outside the access window 21 and the lever member 23 is unlocked when the locking mechanism 11 is in a locked state.

According to the above-described configuration, it is possible to more easily distinguish whether or not the lever member 23 is unlocked.

(4) In lever member 23, the linking portion 56 with respect to the pole 54 of the locking mechanism 11 is formed. With this configuration, it is possible to dispose the unlocking lever device 20 and the locking mechanism 11 to be integrated with each other. Accordingly, it is possible to eliminate the linking member between the locking mechanism 11 and the lever member 23, and to simplify the configuration. As a result, it is possible to achieve a small size of the seat locking device 10.

In addition, the above-described embodiment may be changed as follows.

In the above-described embodiment, the seat locking device 10 is provided on the seatback 3 side. However, the seat locking device 10 may be provided on the vehicle body 4 side. In addition, the seat locking device 10 may be provided not only at a part of locking the seatback of the rear seat, but also at another part. In addition, the unlocking lever device 20 may be used as another device in addition to the seat locking device 10.

In the above-described embodiment, the hole portion 26a of the bezel 26 which is fixed to the housing 24 forms the access window 21. However, this disclosure is not limited thereto, and for example, a hole portion which is formed on a design surface (for example, a sheet cover or a trim) at a part where the unlocking lever device 20 is provided may form the access window 21.

In the above-described embodiment, the lever member 23 is biased in the direction of the unlocking operation, but the rotation and bias direction may be reverse thereto (lock returning direction).

In the above-described embodiment, the lever member 23, the sign member 30, the housing 24, and the bezel 26 are respectively formed by using a resin, but may be formed of other materials, such as metal. In addition, materials of the lever member 23, the sign member 30, the housing 24, and the bezel 26 may be different from each other.

In the above-described embodiment, the sign member 30 is biased in a direction in which the sign member 30 is protruded from the storage recessed portion 31 based on the spring force of the compression coil spring 32. However, the bias member thereof may be arbitrarily changed. For example, an elastic member, such as rubber, may be used.

In addition, the bias member may be integrally formed of the same material as that of the sign member 30. As a result, it is possible to further simplify the configuration. Accordingly, it is possible to achieve efficiency in a manufacturing process and an assembly process.

Figure 14:
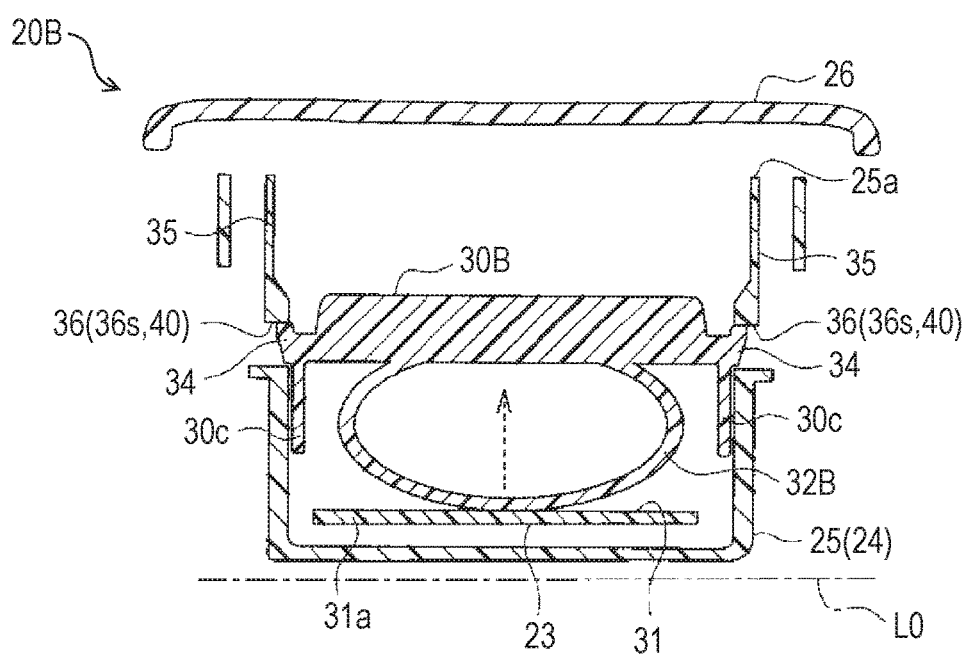
FIG. 14 is a cross-sectional view (cross section along XIV-XIV in FIG. 5) illustrating an additional example of the unlocking lever device.

In other words, it is possible to generate the spring force (elastic restoring force) based on the shape according to the type of the material. For example, similarly to an unlocking lever device 20B illustrated in FIG. 14, when the resin is used as a material of the sign member 30, by forming an annular portion which can be elastically deformed integrally with (the main body portion 30a of) a sign member 30B, the annular portion becomes a ring spring 32B. In addition, as the ring spring 32B abuts against the bottom wall portion 31a of the storage recessed portion 31, it is possible to bias the sign member 30B in a direction in which the sign member 30B is protruded from the storage recessed portion 31. Furthermore, regarding the bias member which has the same material as that of the sign member 30 and is formed integrally, the shape thereof may also be arbitrarily changed. For example, when metal is used, a shape of a board spring may be formed.

In the above-described embodiment, the inner circumferential surface 36s of the engaging recessed portion 36 which is provided in both side wall portions 35 of the lever storage portion 25 which is orthogonal to the rotation shaft L0 of the lever member 23 forms the inclined surface 40. However, this disclosure is not limited thereto, and any inclined surface which can regulate the protrusion of the sign member 30 in accordance with the position of the rotation of the lever member 23 and can generate the bias force which rotates the lever member 23 may be arbitrarily changed as the inclined surface 40. For example, the inclined surface 40 may be not only on the inner circumferential surface 36s of the engaging recessed portion 36, but also on a side surface of a protrusion portion. In addition, a member in which the inclined surface 40 is formed may not be the housing 24, and for example, may be a member, such as the bezel 26 or the like, in which the access window 21 is formed. In addition, regarding a position where the sign member 30 side abuts against the inclined surface 40, the engaging protrusion portion 34 may not necessarily be provided, and for example, a part of the main body portion 30a abuts against the inclined surface 40.

In the above-described embodiment, in the lever member 23, the linking portion 56 with respect to the pole 54 of the locking mechanism 11 is formed. In addition, the seat locking device 10 is provided to be integrated with the locking mechanism 11 and the unlocking lever device 20. However, this disclosure is not limited thereto, and the locking mechanism 11 and the unlocking lever device 20 may be connected to each other via a connecting member, such as a link or wire.

The shape of the lever member 23 or the sign member 30 may be arbitrarily changed. In addition, the configuration of the housing 24 which becomes the supporting member may also be arbitrarily changed.

In the above-described embodiment, the locking mechanism 11 is provided with the latch 53 which includes the striker engaging portion 53a and is supported to be rotatable, and the pole 54 which is engaged with and disengaged from the latch 53. However, this disclosure is not limited thereto, and the configuration of the locking mechanism 11 may be arbitrarily changed.

An aspect of this disclosure is directed to an unlocking lever device, preferably including: a lever member which is operated to rotate to allow a locking mechanism to perform an unlocking operation; a sign member which is stored in a storage recessed portion provided in the lever member; a bias member which biases the sign member in a direction of protrusion from the storage recessed portion; and an inclined surface which regulates the protrusion of the sign member from the storage recessed portion in accordance with a position of rotation of the lever member by being abut against the sign member, and generates a bias force which allows the lever member to rotate.

According to this configuration, it is possible to allow the sign member to appear from the storage recessed portion in accordance with a situation of the unlocking operation, with a simple configuration. Accordingly, by improving visibility of the sign member, it is possible to distinguish whether or not the lever member is easily unlocked.

In addition, as the sign member presses the inclined surface based on the bias force of the bias member, the bias force which rotates the lever member is applied to the sign member. Accordingly, without providing a dedicated bias member for biasing the lever member to rotate in advance, it is possible to efficiently suppress backlash of the lever member with a simple configuration.

In the unlocking lever device of the aspect of this disclosure, it is preferable that the unlocking lever device includes a supporting member which includes a side wall portion which is orthogonal to a rotation shaft and supports the lever member to be rotatable, and an engaging recessed portion into which an engaging protrusion portion provided in the sign member is inserted is formed in the side wall portion, and that the inclined surface is formed on an inner circumferential surface of the engaging recessed portion.

In other words, the engaging protrusion portion of the sign member which is inserted into the engaging recessed portion abuts against the inner circumferential surface in a protruding direction. Therefore, according to the above-described configuration, it is possible to stably regulate the protrusion of the sign member in accordance with the position of the rotation of the lever member, and to stably bias the lever member to rotate.

In the unlocking lever device of the aspect of this disclosure, it is preferable that the supporting member supports the lever member at a position which faces an access window, and the storage recessed portion is formed at a position to which the sign member moves in the access window as the sign member is disposed outside the access window and the lever member is unlocked when the locking mechanism is in a locked state.

According to this configuration, it is possible to more easily distinguish whether or not the lever member is unlocked.

In the unlocking lever device of the aspect of this disclosure, it is preferable that the sign member and the bias member have the same material and are formed to be integrated with each other.

According to this configuration, it is possible to employ a much simpler configuration. Accordingly, it is possible to achieve efficiency in a manufacturing process and an assembly process.

In the unlocking lever device of the aspect of this disclosure, it is preferable that the locking mechanism includes a latch which has a groove portion in which a striker is engaged with a circumferential surface thereof and is provided to be rotatable, and a pole which holds an engaged state with the striker by being engaged with the latch and regulating the rotation of the latch, and releases the engaged state by being operated to rotate, and a linking portion which is linked to the pole is provided in the lever member.

According to this configuration, it is possible to dispose the unlocking lever device and the locking mechanism to be integrated with each other. Accordingly, it is possible to simplify the configuration by eliminating a linking member between the locking mechanism and the lever member. As a result, it is possible to achieve a small size of the entire locking device.

In the unlocking lever device of the aspect of this disclosure, it is preferable that the pole has a fitting projection, and the linking portion is an aperture which is fitted to the fitting projection.

According to the aspect of this disclosure, it is possible to efficiently suppress backlash of the lever member by a simpler configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An unlocking lever device, comprising:

a lever member which is operated to rotate to allow a locking mechanism to perform an unlocking operation;

a sign member which is stored in a storage recessed portion provided in the lever member;

a bias member which biases the sign member in a direction of protrusion from the storage recessed portion; and an inclined surface which regulates the protrusion of the sign member from the storage recessed portion in accordance with a position of rotation of the lever member by being abut against the sign member, and generates a bias force which allows the lever member to rotate.

2. The unlocking lever device according to claim 1, wherein the unlocking lever device comprising a supporting member which includes a side wall portion which is orthogonal to a rotation shaft and supports the lever member to be rotatable, and an engaging recessed portion into which an engaging protrusion portion provided in the sign member is inserted is formed in the side wall portion, and wherein the inclined surface is formed on an inner circumferential surface of the engaging recessed portion.

3. The unlocking lever device according to claim 2, wherein the lever member is operated to rotate via an access window, wherein the supporting member supports the lever member at a position which faces the access window, and wherein the storage recessed portion is formed at a position to which the sign member moves in the access window as the sign member is disposed outside the access window and the lever member is unlocked when the locking mechanism is in a locked state.

4. The unlocking lever device according to claim 1, wherein the sign member and the bias member have the same material and are formed to be integrated with each other.

5. The unlocking lever device according to claim 1, wherein the locking mechanism includes a latch which has a groove portion in which a striker is engaged with a circumferential surface thereof and is provided to be rotatable, and a pole which holds an engaged state with the striker by being engaged with the latch and regulating the rotation of the latch, and releases the engaged state by being operated to rotate, and wherein, a linking portion which is linked to the pole is provided in the lever member.

6. The unlocking lever device according to claim 5, wherein the pole has a fitting projection, and wherein the linking portion is an aperture which is fitted to the fitting projection.

* * * * *